July 27, 1954  G. GRINDROD  2,684,905
METHODS FOR CHEESE PACKAGING AND TREATMENT
Filed Jan. 25, 1950
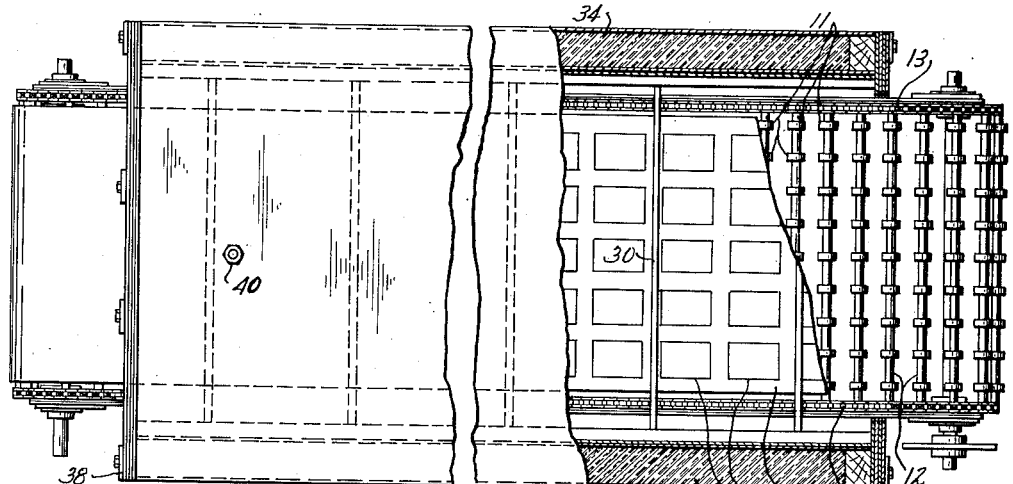
Fig. 1
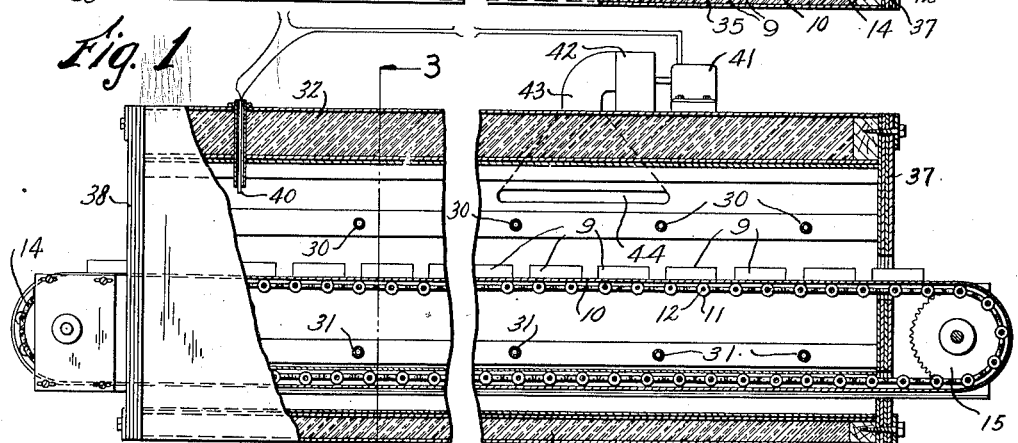
Fig. 2
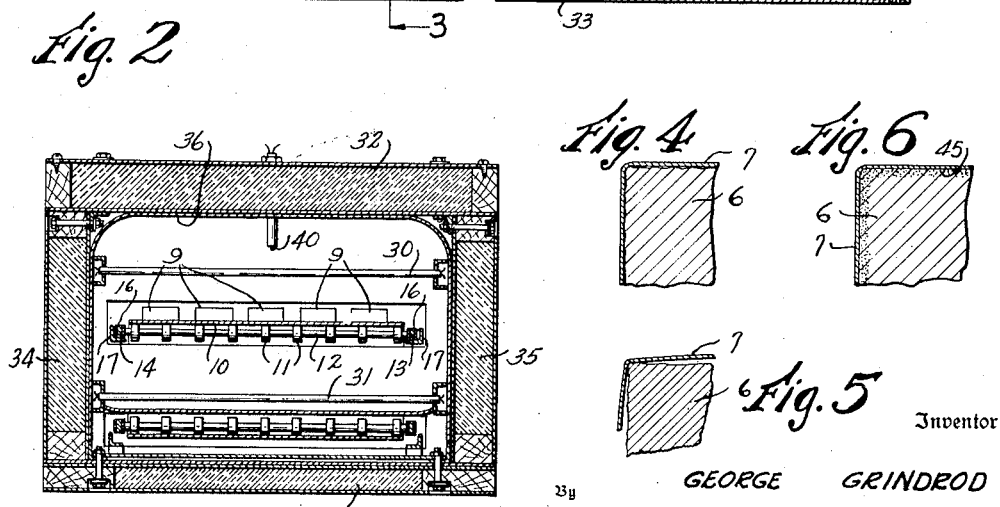
Fig. 3
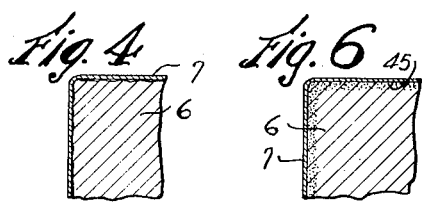
Fig. 4  Fig. 6
Fig. 5
Inventor
GEORGE GRINDROD
Wheeler, Wheeler, + Wheeler
Attorney Patented July 27, 1954

2,684,905

UNITED STATES PATENT OFFICE 2,684,905

METHODS FOR CHEESE PACKAGING AND TREATMENT

George Grindrod, Oconomowoc, Wis.

Application January 25, 1950, Serial No. 140,413

10 Claims. (Cl. 99—178)

This invention relates to apparatus and methods for cheese packaging and treatment. It is applicable to other foods only if they have comparable properties. The invention is primarily intended for cheese of the hard type. It is useful not only for blocks of aged cheese cut into retail sizes and wrapped for sale, but is also useful for larger blocks of green cheese which are wrapped for curing. The wrapping material used is desirably transparent to light, but not necessarily so, the only requirement being that it be transparent to heat.

The object of the invention is to protect the packaged cheese from spoilage without impairing its quality or appearance, and to do this by means adaptable to high speed, mechanized production, as distinguished from hand operations heretofore commonly employed. It is a further object to provide for the handling of various sizes and shapes of packages simultaneously or alternately, and continuously.

The invention is based upon, and seeks to utilize, principles new to the cheese industry in whole or in part as follows:

(1) I have found that cheese is opaque to infra-red radiation and has relatively low conductivity, so that, at certain intensities and frequencies of such radiation, the surface of the cheese becomes quickly heated without substantial heating of sub-surface portions of the cheese.

(2) Certain wrapping materials, and particularly transparent plastic films as hereinafter disclosed, are substantially completely transparent to infra-red radiation and will, without becoming directly heated, or being impaired by the heat, pass to the contained cheese an intense radiation capable of melting the cheese.

(3) Radiant heating of cheese causes a reversal of the emulsion in the outer layer, whereby, exclusively in such outer layer, the water phase, normally external and continuous in cheese, is reversed to become the discontinuous phase, while the oil becomes the external phase. Thus, a skin or thin layer of reversed emulsion is produced which follows the contour of the cheese under treatment.

(4) Surface growing, spoilage-inducing organisms do not grow in or penetrate the reversed emulsion comprised in such a skin or layer.

(5) A normally intense infra-red radiation applied to a package comprising cheese previously wrapped in a heat-transparent membrane will develop directly in the surface portions of the cheese under the membrane a near-sterilizing heat which kills vegetative organisms other than mold spores, thereby greatly reducing the active contamination, as well as sealing the surface of the cheese as above described.

(6) Certain heat-transparent wrapping materials used in packaging cheese for the purposes of the present invention have the peculiar quality (differing in degree in different materials) of passing air and water vapor in the presence of heat and becoming impermeable when removed from heat radiation.

From the foregoing, it will be understood that it is, more specifically, the object of the invention to create a continuous outer layer following all cut or exposed surfaces of the cheese which has no continuous water phase but, instead, consists of oil surrounding each particle of the water phase. The layer should be continuous, or complete, but may be very thin. Such a layer is produced by subjecting a block of cheese, preferably already wrapped, to radiation with red or infra-red at an intensity so regulated as to cause heat penetration only about 1 millimeter and to reverse the emulsion to about that depth.

It is a further specific object of the invention to be able, in the course of heat treatment of a previously closed and sealed package of cheese, to be able to vent water vapor and a considerable portion of the residual air within the package through the pores of the wrapper which will thereupon become impermeable and collapse under atmospheric pressure against the reversed phase layer on the surface of the contained cheese.

The foregoing and other objects of the invention will be more specifically apparent from the following disclosure thereof.

In the drawings:

Fig. 1 is a top view of apparatus embodying my invention partially in plan with portions broken away and shown in section to illustrate inner details of construction.

Fig. 2 is a side view of the apparatus of Fig. 1 partially in side elevation with portions broken away and shown in section to illustrate inner details of construction.

Fig. 3 is a cross sectional view taken on line 3—3 of Fig. 2.

Fig. 4 is a fragmentary diagrammatic cross sectional view of a piece of wrapped cheese before treatment by the process of this invention.

Fig. 5 is a view similar to Fig. 4 showing the same piece of cheese in the course of treatment.

Fig. 6 is a view similar to Fig. 4 showing the same piece of cheese after treatment.

Cheese is a plastic emulsion in which fat normally exists as the dispersed phase, the outer phase being a hydrated protein which is continuous. Mold and other organisms lodged on the surface of cheese grow into the continuous water phase only. There is no spoilage growth which starts inside or beneath the surface of cheese, the organisms being either static or sterile beneath the surface. Thus, even a freshly molded cheese, which is certainly not sterile in its interior, does not normally undergo any spoilage growth except on its surface.

Evacuation of contaminated air from the space between the surface of the cheese and its wrapper, with or without the use of wrapper heating means, has proved insufficient to dependably prevent mold growth. It is practically impossible to remove all of the air or to reach all surfaces of the cheese with pasteurizing temperatures through contact of the wrapper with a heated surface. The wrapper is inevitably wrinkled and, especially at the edges and corners of the cheese, some air is entrapped, or some surface inadequately heated. Even a small amount of mold at these points impedes the sale of the product.

For the purposes of the present invention, the cheese is desirably wrapped with a web of material which is not only optically transparent, or substantially so, but also transparent to infrared radiation in the range of wave lengths which is preferably employed. The range of useful radiation has been found to lie between 8,000 Angstrom and 100,000 Angstrom units, or, expressed in centimeters, between $8 \times 10^{-5}$ cm. and $8 \times 10^{-3}$ cm. In practice, this radiation is preferably derived from rod or coil-type resistors, electrically heated to the edge of a visible red and suitably arranged for uniformity of distribution of their radiation within a tube of polished aluminum through which pass the wrapped cheese blocks to be treated. Some secondary radiation from the walls of the tube is probably of greater wave length, to which the wrapper is less transparent, but this does no practical harm.

The intensity of radiation has been determined experimentally by varying the intensity and the period of treatment. The most practical combination of intensity and time has been found to involve an exposure for a period of 60 to 120 seconds to radiation of an intensity corresponding to 5 watts per square inch of exposed cheese.

The first desirable quality of a satisfactory wrapping web is dry air impermeability. One transparent wrap material widely used for other purposes is a nitro-cellulose film sold under the trade-mark "cellophane." This particular material is not suited for the present process because it is permeable to dry air.

However, in addition to being impermeable to dry air, a wrapping film which is most desirable for use in the practice of the present invention is one which is freely permeable to air and water vapor when heated. This property is one not heretofore recorded or measured to my knowledge. Tests to show qualitatively the degree of air impermeability and air-vapor permeability have been made using numerous wrapping materials.

From each film to be tested, two balloon-like envelopes are made by heat sealing their edges around an inserted piece of rubber tubing through which access may be had to the interior. In one envelope of each pair, a small amount of water is inserted. Both envelopes are then inflated with air to the same degree, and both are placed in any oven, or in the radiation apparatus herein disclosed. In the presence of heat, both envelopes will swell. The envelope containing no water should retain its swell for at least three minutes and resume its original degree of inflation upon cooling. An envelope containing water will, if it has the required vapor permeability, collapse within two to three minutes of heating and will be completely flat upon cooling.

Of materials thus tested, rubber hydrochloride ("Pliofilm") shows a satisfactory partial retention of dry air and partial collapse when heated vapor is released. It is also satisfactory in practical use for cheese wrapping. A vinyl chloride film shows marked permeability to vapor and air when heated, and the envelopes collapse quickly upon cooling. Poly-ethylene shows medium dry air impermeability and somewhat slow permeability to vapor and air when heated. Vinyl nitrile (a plasticized brand of which is sold as "Visten") is virtually impermeable to dry air and readily permeable to moist air and shows quick and complete collapse when cooled. Since this material is also very satisfactory as a wrap for cheese, it is the best known for the purposes of the present invention.

A cheese block 6 is packaged by any desired procedure in a transparent plastic wrapper 7 which is preferably sealed. As shown in Fig. 4, which is a fragmentary section through such a package, there are microscopic irregularities on the surface of the cheese so that the wrapper 7 is not in full superficial contact with the cheese.

Successive packages of cheese are transported through a tunnel in which they are subjected on all of their surfaces to radiant heat. Each of the cheese packages 9 comprises a cheese block sealed in its respective wrapper. The packages are spaced both longitudinally and laterally upon a conveyor apron 10 which is so selected that it also is adapted to pass the radiation relied upon for treatment. It desirably is made of an opaque plastic material such as the tetrafluorethylene resin known commercially as "Teflon." In practice, I have used an apron or belt about .02 inch thick and 12 inches to 24 inches in width. This material, although opaque to light, offers substantially no impedence to long wave heat of the type of radiation indicated. It is further capable of maintaining its mechanical strength at or above 400° F. A fabric reenforced plastic belt using other materials has been found practicable as a carrier, although less durable than "Teflon." Other combinations and other reenforcements of plastic having adequate heat resistance will probably be entirely satisfactory, since there is nothing critical about the belt.

The belt is not relied upon for the mechanical support of the work pieces 9, but is carried on the disks 11 which are spaced at intervals along the rods 12 which connect the laterally spaced conveyor chains 13, 14 which operate over suitable sprockets 15 at each end of the conveyor. It is best shown in Fig. 3. Each of the cross rods 12 of the skeleton conveyor may carry rollers 16 operating in guides 17 which provide continuous support for the rods upon which the apron or belt 10 is mounted to support the work pieces 9.

At intervals above and below the path of movement of the work pieces 9 upon the apron, I provide the upper and lower radiant resistance elements 30, 31. The top wall 32, bottom 33, and side walls 34 and 35 of the tunnel are not only desirably heavily insulated, but may also be provided with a reflective type polished aluminum liner at 36, as best shown in Fig. 3. The tunnel may have laminated ends 37 and 38 with apertures as best shown in Fig. 2 and Fig. 3 for passing the upper and lower runs of the conveyor chain and belt and admitting the work pieces into the tunnel and discharging them therefrom.

The temperature of the air in the tunnel has virtually no effect on the blocks of cheese, which are insulated save for the radiation frequencies to which the wrappers are substantially wholly transparent. The insulating effect which seals the cheese from the air temperature is partly attributable to the wrappers, and partly attributable to the gases contained within the wrappers. These gases expand as soon as the treatment commences, causing the wrappers to bulge from the contained block of cheese in the manner diagrammatically indicated in Fig. 5. As will be explained hereinafter, the water vapors and gases responsible for the bulging, escape through the wrapper during the heat treatment, and the wrapper, upon removal of the package from the tunnel, becomes substantially impervious and collapses onto the cheese as shown in Fig. 6 and is held in intimate contact with the cheese under considerable atmospheric pressure differential.

Not only does the air temperature in the tunnel have little or no effect on the cheese; it also bears no fixed relationship to the intensity of radiation. However, under constant conditions of air circulation and insulation, the air temperature will ultimately reach a point of equilibrium. Since this air temperature has a bearing on the heating of the wrapper and also a bearing on the temperature at which the belt or apron 19 must operate, it is preferred that the air temperature be controlled. Any suitable thermostatic control of air circulation may be provided, that illustrated being purely by way of diagrammatic exemplification. The thermostat 40 controls a motor 41 operating a blower 42, the inlet of which is connected by pipe 43 with a vent 44 opening from the tunnel. Where gravity flow does not suffice to provide adequate air circulation, this device may be used to maintain the preferred tunnel temperature which, in practice, is kept at about the softening point of the wrap used in the packages, so that the air of the tunnel will neither appreciably add to, nor detract from, the heat which the wrap tends to get from the radiation and from contact with the cheese and the belt. In practice, we have found it permissible to maintain the tunnel air temperature at 212° to 220° F., making allowances for variations in the temperature of the cheese packages admitted.

In this particular apparatus, the cheese packages are spaced about 1½ inches apart in order that the radiation may reach all edges. The apparatus is designed to treat 120 one-pound blocks of cheese per minute. The tunnel is 24 inches wide and 120 inches long. The resistors used at 30 and 31 for infra-red radiation are uniformly distributed both above and below the work supporting run of the conveyor, and they total approximately 14,500 watts. The exposure of each block of cheese continues for a period of 90 to 120 seconds in the preferred practice of the invention.

The intensity of radiation required was determined experimentally. Cut cheese was treated with mold dust of a type such that a positive growth occurred on wrapped, but untreated pieces. Then, additional pieces, similarly inoculated and wrapped, were exposed to radiation of successively increasing intensity until visible surface melting occurred. The intensity which prevents mold growth completely is the desired intensity and, in practice, has been found to fall within the range of operating conditions above specified, the period of exposure being approximately two minutes.

The period of exposure was also determined experimentally, and is not a constant. It will be understood that the exposure may be lengthened or shortened according as the rate of radiation is decreased or increased.

The fact that the belt or apron used on the conveyor is substantially entirely transparent to the long wave heat radiation prevents the belt from being heated by such radiation. It reaches air temperature only. It would take a very long period of time to raise the cheese to the point of colloidal reversal if exposed only to heated air. During this time, the whole block of cheese would tend to have its temperature raised uniformly. The radiant heat used heats the surface of the cheese block instantly to a much higher degree than is practicable by any other method, while leaving the great mass of the cheese at its original temperature.

The effect on the surface of the cheese is substantially the same whether the product is radiated before wrapping or after wrapping. There are, however, two compelling reasons for wrapping before treatment. In the first place, it is difficult to handle the block of cheese when its surface has been softened by radiation, and consequently wrapping after treatment would involve serious technical problems. In the second place, a properly chosen wrapper acts like a check valve which leaves the cheese under sub-atmospheric pressure when it issues from the tunnel, and this is very desirable in that it permits the wrapper to be collapsed onto the cheese under considerable pressure.

To achieve this result, the wrapping material must be carefully selected. Obviously, it must be free of open pores or mechanical perforations or defects. Some plastics, such as the nitrocellulose, are inherently too porous to be serviceable for their most advantageous use in connection with this invention. Other plastics are subject to invisible perforations, but these may be used if two very thin plies are laminated together, the chance of their perforations being in registry being remote. Some other plastic membranes impart undesirable flavors, and consequently are not useful for such food products as cheese. Still other membranes or thin films which constitute good packaging materials for general uses are not desirably transparent to the heat radiation. The most satisfactory wrapping material known to me for the achievement of all of the advantages of my invention is "Visten," above referred to.

Experiments conducted independently of the cheese blocks above referred to show that "Visten" will, when heated, freely pass water vapor and will also pass other gases in the presence of water vapor, but when the "Visten" is again cool, it becomes substantially impervious to water vapor to leave a partial vacuum in the space from which the vapor has escaped.

Cheese wrapped with "Visten" readily gives off water vapor when heated, and packages of cheese passing through the tunnel in the course of the treatment herein disclosed are observed to have their wrappers 7 distended very substantially upon entering the oven, as shown in Fig. 5. As the packages leave the oven, the wrappers collapse quite abruptly into intimate contact with the surface of the cheese as shown in Fig. 6, wherein the thin stippled area at 45 represents the skin of reversed emulsion.

"Pliofilm"-wrapped packages disclose the same phenomenon, although the "Pliofilm" film reacts a little more slowly than the "Visten." In the case of "Visten," a two-minute heating at any temperature close to boiling will apparently expel all air from a small space in which water vapor is present. Softening of the film by heat alone, even to temperatures of 300° F., has very little effect on air permeability in the absence of water vapor. These qualities of "Visten" are believed to be responsible for the superior results achieved in keeping "Visten"-wrapped cheese for longer periods without mold formation than is possible with the use of any other wrapping material known to me.

While the method here involved will be clear from the preceding description, it may be summarized as follows:

The cheese or the like, in blocks of appropriate size for sale, is passed either immediately prior to packaging, or after packaging in a sealed wrapper, through a zone of infra-red radiation of such intensity and such duration as to effect colloid reversal of a thin film co-extensive with all surfaces of the block under treatment. In this thin surface portion of the cheese, the initially discontinuous oil phase of the colloid becomes the continuous external phase, enveloping and protecting all particles of hydrated protein to preclude the growth of spoilage organisms thereon. The phase reversal of the colloid is effected with sufficient rapidity, due to the intensity of the infra-red radiation and the wave length employed, that the inner mass of the cheese is substantially unheated, and the heated layer cools almost instantly upon being removed from the zone in which radiation is effected.

The radiation is desirably achieved by exposure simultaneously to numerous sources of radiation at different angles from the block of cheese undergoing treatment, and in the course of the continuous advance of the block of cheese through the zone, thus assuring exposure of all surfaces to the radiation, and further assuring concentration of the radiation upon the edges, these being the points at which mold is first apt to develop.

In the preferred practice of the invention, the cheese has been packaged, prior to treatment, in a wrapper which is substantially wholly transparent to the infra-red radiation employed, and is desirably porous only in the presence of heat and moisture. In consequence, the sudden rise of temperature of water vapor and air in the confined space between the wrapper and the cheese will develop pressure within the wrapper which will cause the rapid escape of the vapor and other gases through the wrapper pores which are opened under these circumstances. Upon removal of the product from the heating zone, the wrapper pores close almost instantly to hermetically seal the package, which is otherwise already sealed. The resulting pressure within the wrapper represents a very substantial degree of vacuum, whereby atmospheric pressure collapses the wrapper into intimate contact with the oily surface of the reversed phase emulsion on the outside of the block of cheese.

While this process precludes the growth of spoilage organisms on the cheese, even if such organisms are present, it is an important incidental advantage of the treatment that many, if not all, of the spoilage organisms between the cheese and the wrapper will be completely killed if the heat treatment has been adequately conducted.

I claim:

1. A method of treating cheese to inhibit growth of mold when the cheese is an emulsion having fat in a dispersed phase and having a hydrated protein as a continuous outer phase, said method comprising abruptly reversing the emulsion to constitute the fat as the external phase at the surface only by exposing the surface of a block of the cheese to infra-red radiation until phase reversal occurs throughout such surface.

2. The method recited in claim 1 in which the radiation is within the approximate range of 8,000 to 100,000 Angstrom units, and the exposure of the cheese to said radiation is terminated before the phase reversal extends below a depth of about one millimeter in the cheese.

3. A method of packaging cheese constituting an emulsion having fat in a dispersed phase and having a hydrated protein as an outer phase, said method comprising enveloping a body of such cheese in a plastic wrapper which is relatively impervious to air when cool and pervious when heated, substantially closing the wrapper about the cheese; and reversing the emulsion phase at the surface of the cheese body by subjecting the cheese surface only to heat radiation through the wrapper, whereby to release water vapor from the cheese and to expel said water vapor and air from the interior of the wrapper and bring external phase fat to the surface of the cheese to bond the wrapper to the cheese.

4. The method of claim 3 followed by the step of cooling the wrapper to collapse the wrapper onto the cheese in air-excluding bond with the reversed emulsion at the cheese surface.

5. The method of claim 3 in which the radiation is approximately between 8,000 and 100,000 Angstrom units, and is at the rate of about 5 watts per square inch of cheese surface, and is continued for a period of the general order of 90 to 120 seconds, and the exposure of the cheese to said radiation is terminated before the phase reversal extends below a depth of about one millimeter in the cheese.

6. The method of claim 3 including radiation of heat upon the wrapped cheese from all sides substantially simultaneously whereby to reverse its surface emulsion phase over substantially its entire surface at one time.

7. The method of claim 6 including the step of continuously advancing the cheese during said radiation and maintaining the temperature of ambient air about the wrapped cheese during said advance in a range from close to the boiling point of water to the temperature at which the wrapper softens.

8. The process of treating packaged cheese to inactivate mold spores comprising the steps of subjecting the cheese packages to infra-red radiation equal to approximately five watts per square inch of cheese surface for a period within the range from 90 to 120 seconds, and controlling the temperature of the air about said packages at substantially the same temperature existing between the cheese wrap and the cheese.

9. A method of packaging cheese which comprises sealing a mass of cheese in a heat-transparent, plastic wrapping web, passing the packaged cheese through a heating zone while exposing it to intense infra-red radiation from a plurality of sources to which all surfaces of the cheese are exposed in passing through such zone, the exposure of the cheese to radiation in such zone being continued for a period of the general order of ninety to one-hundred and twenty seconds, and the intensity of radiation being sufficient to kill or inhibit spoilage organisms at the surface of the cheese within the package, the wave length of the radiation lying between 8,000 and 100,000 Angstrom units, and the intensity corresponding to approximately 5 watts per square inch of cheese.

10. A cheese package comprising, a cheese having an interior portion comprising a normal emulsion of a fat dispersed phase in a continuous hydrated protein phase, said cheese having a thin unbroken layer completely enveloping said interior portion of reversed phase wherein the fat is the continuous phase and the hydrated protein is the dispersed and non-continuous phase and a wrapper hermetically sealed about the cheese and bonded to the cheese by said fat.

References Cited in the file of this patent

UNITED STATES PATENTS

| Number | Name | Date |
|---|---|---|
| 1,626,041 | Kyle et al. | Apr. 26, 1927 |
| 1,662,847 | Cook | Mar. 20, 1928 |
| 1,863,222 | Hoermann | June 14, 1932 |
| 2,051,057 | Pettit | Aug. 18, 1936 |
| 2,228,492 | Wetherbee | Jan. 14, 1941 |
| 2,257,366 | Bates et al. | Sept. 30, 1941 |
| 2,263,866 | Barber | Nov. 25, 1941 |
| 2,308,332 | Irwin et al. | Jan. 12, 1943 |
| 2,332,099 | McKinnis | Oct. 19, 1943 |
| 2,360,257 | Muller | Oct. 10, 1944 |
| 2,391,195 | Ross et al. | Dec. 18, 1945 |
| 2,410,427 | Chappell | Nov. 5, 1946 |
| 2,419,875 | Birdseye | Apr. 29, 1947 |
| 2,428,090 | Naeher et al. | Sept. 30, 1947 |
| 2,529,253 | Hoffman et al. | Nov. 7, 1950 |
| 2,533,125 | Levinson et al. | Dec. 5, 1950 |
| 2,540,815 | Eldridge | Feb. 6, 1951 |
| 2,606,122 | Stark | Aug. 5, 1952 |

OTHER REFERENCES

"Application of Germicidal, Erythemal and Infrared Energy," 1946, by M. Luckiesh, published by D. Van Nostrand Company, Inc., 250 Fourth Avenue, New York, pages 22, 23, 368, 369, 370 and 371.